(12) United States Patent
Schnittger et al.

(10) Patent No.: US 11,897,699 B2
(45) Date of Patent: Feb. 13, 2024

(54) METHOD FOR OPERATING A DELIVERY APPARATUS, AND DELIVERY APPARATUS

(71) Applicant: J. Wagner GmbH, Markdorf (DE)

(72) Inventors: Thorsten Schnittger, Frickingen (DE); Lam Huu Nguyen, Woodbury, MN (US); Florian Spindler, Ravensburg (DE); Alfred Göhring, Salem (DE)

(73) Assignee: J. Wagner GmbH, Markdorf (DE)

( * ) Notice: Subject to any disclaimer, the term of this patent is extended or adjusted under 35 U.S.C. 154(b) by 736 days.

(21) Appl. No.: 17/091,230

(22) Filed: Nov. 6, 2020

(65) Prior Publication Data
US 2021/0107746 A1 Apr. 15, 2021

Related U.S. Application Data

(63) Continuation of application No. PCT/EP2019/061842, filed on May 8, 2019.

(30) Foreign Application Priority Data

May 9, 2018 (DE) ...................... 10 2018 111 120.7

(51) Int. Cl.
*B65G 43/08* (2006.01)
*B65G 33/14* (2006.01)
*B65G 33/34* (2006.01)
*E04G 21/04* (2006.01)

(52) U.S. Cl.
CPC ............. *B65G 43/08* (2013.01); *B65G 33/14* (2013.01); *B65G 33/34* (2013.01); *E04G 21/0436* (2013.01)

(58) Field of Classification Search
CPC ........ B65G 43/08; B65G 33/14; B65G 33/34; B65G 53/32; B65G 53/48; E04G 21/0436; F04C 2/1071; F04C 13/001
See application file for complete search history.

(56) References Cited

U.S. PATENT DOCUMENTS 5,711,480 A * 1/1998 Zepke ................ G05D 23/1905
318/16
6,973,375 B2 12/2005 Brodeur et al.
(Continued)

FOREIGN PATENT DOCUMENTS

| CN | 1918575 A | 2/2007 |
| DE | 101 07 107 A1 | 8/2002 |

(Continued)

OTHER PUBLICATIONS

Chinese Office Action (Application No. 201980031367.0) dated Apr. 25, 2022 (with English translation).
(Continued)

*Primary Examiner* — Kidest Bahta
(74) *Attorney, Agent, or Firm* — BURR PATENT LAW, PLLC

(57) ABSTRACT

The invention relates to a method and to a delivery apparatus for carrying out the method, wherein the delivery apparatus comprises an eccentric screw pump having a rotor-stator unit with an outlet, a drive unit, a control device and a delivery section, and wherein the delivery apparatus comprises at least one pressure sensor and a characteristic-variable detection device.

15 Claims, 1 Drawing Sheet

(56) References Cited

U.S. PATENT DOCUMENTS

| | | | |
|---|---|---|---|
| 2002/0192093 A1* | 12/2002 | Gantenhammer | .. F04C 15/0073 |
| | | | 418/48 |
| 2004/0076503 A1 | 4/2004 | Rau et al. | |
| 2010/0211205 A1* | 8/2010 | Baumann | ................ H02P 29/10 |
| | | | 700/109 |
| 2011/0103972 A1 | 5/2011 | Jeltsch et al. | |
| 2017/0254202 A1 | 9/2017 | Kern | |
| 2017/0268505 A1 | 9/2017 | Dicks et al. | |

FOREIGN PATENT DOCUMENTS

| | | | | |
|---|---|---|---|---|
| DE | 10 2009 010 334 A1 | 9/2009 | | |
| DE | 20 2009 014 678 U1 | 5/2010 | | |
| DE | 10 2014 112 552 A1 | 3/2016 | | |
| EP | 2 317 143 A2 | 5/2011 | | |
| EP | 3041600 A1 * | 7/2016 | .......... B01F 15/0258 | |
| EP | 3 041 600 B1 | 2/2019 | | |
| JP | H08-304198 A1 | 11/1996 | | |
| JP | 2010-248978 A1 | 11/2010 | | |
| WO | 2011/004982 A2 | 1/2011 | | |

OTHER PUBLICATIONS

German Search Report (Application No. 10 2018 111 120.7) dated Feb. 15, 2019.
International Search Report and Written Opinion (Application No. PCT/EP2019/061842) dated Jul. 23, 2019.
English translation of International Preliminary Report on Patentability (Chapter I) (Application No. PCT/EP2019/061842) dated Nov. 19, 2020, 7 pages.

* cited by examiner

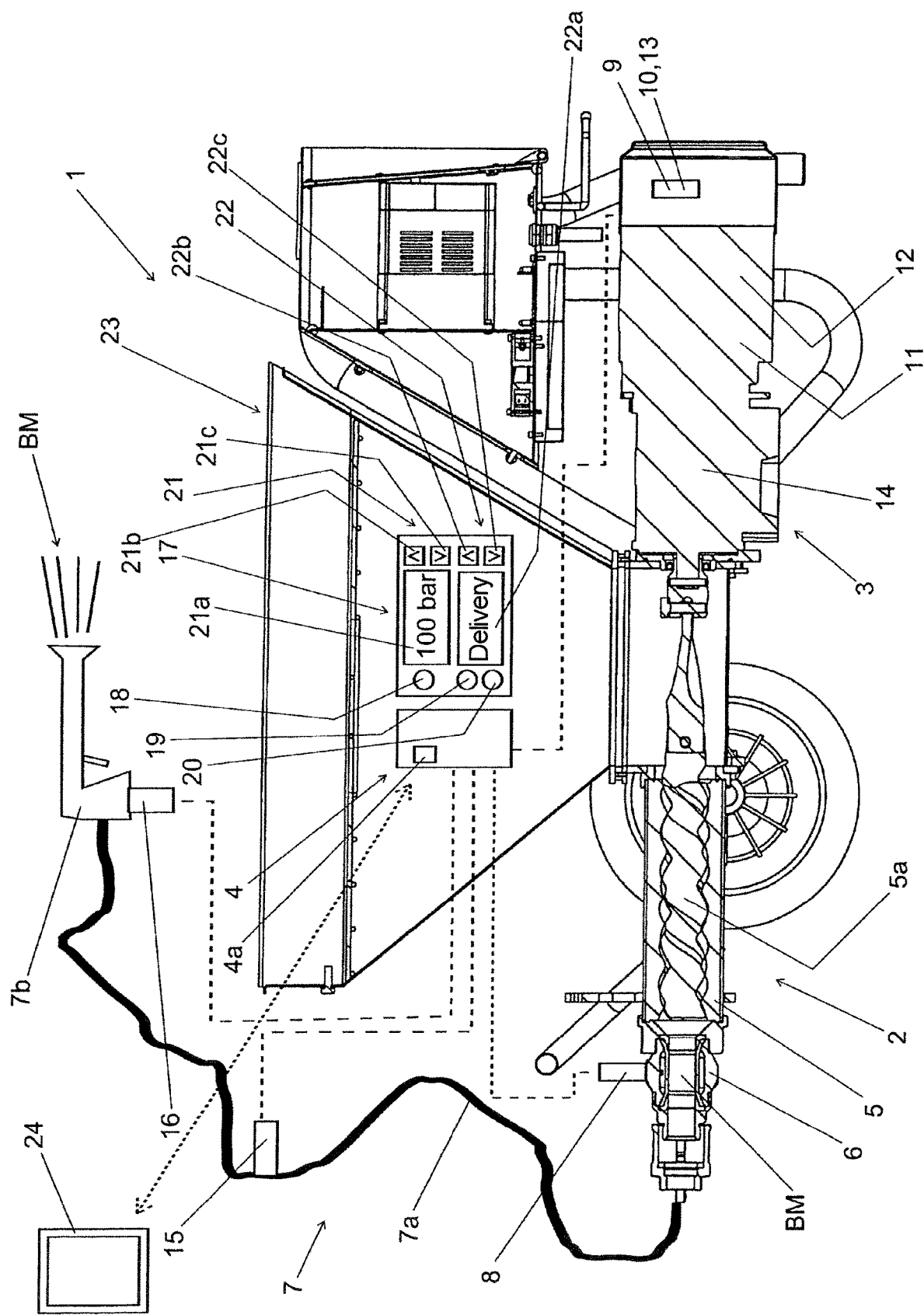

METHOD FOR OPERATING A DELIVERY APPARATUS, AND DELIVERY APPARATUS

CROSS REFERENCE TO RELATED APPLICATIONS

This application is a continuation of International Application No. PCT/EP2019/061842 filed May 8, 2019, which designated the United States, and claims the benefit under 35 USC § 119(a)-(d) of German Application No. 10 2018 111 120.7 filed May 9, 2018, the entireties of which are incorporated herein by reference.

FIELD OF THE INVENTION

The present invention relates to a method for operating a delivery apparatus and a delivery apparatus.

BACKGROUND OF THE INVENTION

DE 20 2009 014 678 U1 discloses a delivery apparatus which comprises an eccentric screw pump having a rotor-stator unit with an outlet, a drive unit, a control device and a delivery section.

SUMMARY OF THE INVENTION

The present invention is based on the object of proposing a method for operating a delivery apparatus and a delivery apparatus for carrying out the method by means of which the delivery apparatus has a long service life and, in particular, a uniform spraying of flowable construction material is ensured and which the delivery apparatus can be operated in such a manner that the delivery apparatus has a long service life and, in particular, a uniform spraying of flowable construction material is ensured.

The method according to the present invention for operating a delivery apparatus for delivering a flowable construction material, such as, for example, paint or plaster or mortar, which delivery apparatus comprises a control device, an eccentric screw pump having a rotor-stator unit with an outlet, and a drive unit, comprises the following steps:

- a target pressure which the eccentric screw pump pumping the flowable construction material is intended to achieve at the outlet or at a delivery section arranged downstream of the outlet is preset at a target-pressure setting device,
- a characteristic variable, in particular, a mechanical or electrical power and/or a rotational speed and/or a torque and/or a current of the drive unit of the eccentric screw pump is measured, an actual pressure in a region of the outlet of the rotor-stator unit and/or in the delivery section arranged downstream of the outlet and being in the form, in particular, of a hose or a tube is measured by at least one pressure sensor,
- a change in the actual pressure measured by the at least one pressure sensor is related to at least one of the characteristic variables in such a manner,
- that, in the event of a rise in the actual pressure above the target pressure, a reduction at least of one of the characteristic variables is brought about by the control device in such a manner that the target pressure is achieved again, and
- that, in the event of a pressure drop in the actual pressure below the target pressure, an increase at least of one of the characteristic variables is brought about by the control device in such a manner that the target pressure is achieved again.

A method of this type affords the advantage that, in particular, the drive unit and the rotor-stator unit of the eccentric screw pump are protected against overloads by avoiding a rise in the actual pressure above a target pressure, and pressure fluctuations is opposed by adjustment to the target pressure by means of adaptation of the characteristic variable or of the characteristic variables and, in particular, of mechanical or electrical power and/or rotational speed and/or torque and/or current such that spraying of the flowable construction material at a constant pressure is ensured. In this connection, the rotational speed and the torque or current and a stable, constant voltage or the power resulting therefrom are the characteristic variables or factors by means of which the actual pressure of the eccentric screw pump is ultimately influenced and by means of which a corresponding readjustment can thus take place optionally or cumulatively. The actual pressure is measured downstream of the rotor-stator unit, namely at the outlet of the rotor-stator unit and/or at a delivery section arranged downstream, and, therefore, the actual pressure is always measured in a region in which the actual pressure is already influenced by the power of the drive unit.

Furthermore, it is provided that the actual pressure is measured by at least two pressure sensors, wherein the actual pressure is measured by the first pressure sensor at the outlet of the rotor-stator unit, and wherein the actual pressure is measured by the second pressure sensor at the delivery section arranged downstream of the outlet, wherein the delivery section also comprises a discharging device out of which the flowable construction material is sprayed, wherein it is provided, in particular, that the actual pressures are compared with one another and with the target pressure in the control device. By this means, firstly, correct operation can be maintained even in the event of failure of a pressure sensor and, by this means, secondly, by comparing the actual pressures measured by the pressure sensors, a conclusion can also be made regarding clogging or leakage in that region of the delivery section which lies between the pressure sensors.

It is also provided that during operation, the target pressure is achieved in such a manner that, in the control device, on the basis of a difference between the at least one measured actual pressure and the target pressure, an adapted characteristic variable value, in particular, an adapted mechanical or electrical power value and/or an adapted rotational speed value and/or an adapted torque value and/or an adapted value of the current is determined by a PI controller and a power and/or a rotational speed and/or a torque of the drive of the eccentric screw pump is set to the value or values. This ensures a readjustment, by means of which pressure fluctuations are substantially avoided.

When at least two pressure sensors are used, it is provided that a pressure difference between the actual pressure measured by the first pressure sensor at the outlet and the actual pressure measured by the second pressure sensor at the delivery section is determined by the control device, and that an optical and/or acoustic warning signal is activated and/or the power of the drive unit is reduced and/or a drive of the drive unit of the rotor-stator unit of the eccentric screw pump is switched off if the actual pressure measured by the second pressure sensor differs considerably, namely, in particular, by more than 30% and preferably more than 50% from the actual pressure measured by the first pressure sensor. By this means, clogging or leakage in the delivery section lying between the pressure sensors can be detected and thus an overloading of the eccentric screw pump or discharge of the flowable construction material at an undesired location can be avoided.

Furthermore, it is provided that the eccentric screw pump is operated either with a first rotor-stator unit for delivering paint, or that the eccentric screw pump is operated with a second rotor-stator unit for delivering mortar or plaster, and that the control device, depending on the rotor-stator unit in operation, is operated either by a first control program which is adapted to the first rotor-stator unit and to target pressures of up to 180 bar, or is operated by a second control program which is adapted to the second rotor-stator unit and to target pressures of up to 60 bar. In the second control program, an operating pressure of 10 to 20 bar and a maximum pressure of 40 bar can also be provided. Accordingly, solely by a rapidly implementable change of the rotor-stator unit and a corresponding change of the control program, paint and also mortar or plaster can be sprayed by the eccentric screw pump with a constant discharge of the flowable construction material.

Furthermore, it is also provided that in switching positions, in which an operating-mode setting device is on "filling and cleaning the eccentric screw pump", pressure changes detected by the at least one pressure sensor are ignored by the control device and, in the switching positions of the operating-mode setting device, the drive unit is operated at a constant rotational speed or at a constant torque or at a constant power which is at most 50% of a rotational speed or a torque or a power with which the drive unit is operated in a "normal mode". It is thereby avoided that abruptly changing measurement values of the at least one pressure sensor during the filling or cleaning undesirably influence the filling or the cleaning of the eccentric screw pump by readjusting the drive unit.

Alternatively, it is also provided that in switching positions, in which an operating-mode setting device is on "filling and cleaning the eccentric screw pump", pressure changes detected by the at least one pressure sensor up to a limit value of, in particular, approximately 25 bar are ignored by the control device and, in the switching positions of the operating-mode setting device, the drive unit is operated at a constant rotational speed or a constant power which is at most 50% of a rotational speed or power with which the drive unit operates in a normal mode and, in the switching positions of the operating-mode setting device, the drive unit is switched off if the limit value is measured at the pressure sensor or at one of the pressure sensors. It is thereby avoided that abruptly changing measurement values of the at least one pressure sensor during the filling or cleaning undesirably influence the filling or the cleaning of the eccentric screw pump by readjusting the drive unit. At the same time, however, it is ensured, by means of a limit value for the pressure change, that extreme pressure fluctuations result in switching off of the drive unit, and therefore the user has the luxury of being able calmly to find and eliminate the cause of the extreme pressure fluctuation.

It is also provided that in a switching position, in which an operating-mode setting device is on "rearward delivering of construction material", pressure changes detected by the at least one pressure sensor are ignored by the control device, and that, in the switching position of the operating-mode setting device, the drive unit is operated in a reverse direction of rotation at a constant rotational speed or a constant torque which, in comparison to a normal mode, is at most 50% of a rotational speed or a torque with which the drive operates in a normal mode. It is thereby avoided that abruptly changing measurement values of the at least one pressure sensor during the rearward delivering undesirably influence the rearward delivering of the eccentric screw pump by readjusting the drive unit.

Alternatively, it is also provided that in a switching position, in which an operating-mode setting device is on "rearward delivering of construction material", pressure changes detected by the at least one pressure sensor up to a limit value of in particular approximately 25 bar are ignored by the control device, and that, in the switching position of the operating-mode setting device, the drive unit, with an actual pressure lying below the limit value, is operated in a reverse direction of rotation at a constant rotational speed or a constant torque which is at most 50% of a rotational speed with which the drive unit operates in a normal mode, and, in the switching position of the operating-mode setting device, the drive is switched off when an actual pressure reaches the limit value. It is thereby avoided that abruptly changing measurement values of the at least one pressure sensor during the rearward delivering undesirably influence the rearward delivering of the eccentric screw pump by readjusting the drive unit. At the same time, however, it is ensured, by means of a limit value for the pressure change, that extreme pressure fluctuations result in switching off of the drive unit, and, therefore, the user has the luxury of being able calmly to find and eliminate the cause of the extreme pressure fluctuation.

Furthermore, the method provides that the target pressure to be produced by the eccentric screw pump is set by means of a manually actuable target-pressure setting device arranged on a delivery apparatus and/or that the target pressure to be produced by the eccentric screw pump is set by means of an application which can be executed on an electronic device, wherein data traffic between the control device and the electronic device is carried out wirelessly by means of a direct connection or wirelessly via a mobile radio network. By this means, the advantages of on-site operation and remote operation are provided alternatively or cumulatively. By means of operation via the electronic device, it is easily possible for a site manager to monitor even a plurality of delivery apparatuses and to set same within a short time from a single location.

Finally, the present invention provides that the delivery apparatus is operated in a normal mode in such a manner that, in the event of a sudden drop in the actual pressure to, in particular, below 5 bar, the sudden drop being determined by the first pressure sensors, the drive unit is switched off and/or an acoustic or optical interfering signal is activated by the control device and/or an interfering signal is transmitted by the control device to an electronic device if the drop in the actual pressure is established without a power drop of the drive unit being established. This enables an imminent dry running of the eccentric screw pump of the delivery device to be identified, and, therefore, switching off can be effected before the eccentric screw pump overheats, or other suitable measures can be taken.

The delivery apparatus according to the present invention for carrying out a method comprises an eccentric screw pump having a rotor-stator unit with an outlet, and a drive unit, a control device and a delivery section, wherein the delivery apparatus comprises at least one pressure sensor and a characteristic-variable detection device. By means of the presence of the characteristic-variable detection device, an operating state of the drive unit is also known to the control device, and it is thus possible for the control device to orient a correcting variable to an ACTUAL state of the drive device.

Furthermore, it is provided, in the case of the delivery apparatus, that the characteristic-variable detection device comprises a rotational speed sensor by means of which a rotational speed of the of the eccentric screw pump or of a drive of the drive unit of the delivery apparatus can be detected, and/or that the characteristic-variable detection device comprises a torque sensor by means of which a torque of the delivery screw of the eccentric screw pump or of a drive of the drive unit of the delivery apparatus can be detected, and/or that the characteristic-variable detection device comprises a power sensor which, in particular, detects voltage and current received by the drive of the drive unit, by means of which a power of the delivery screw of the eccentric screw pump or of a drive of the drive unit of the delivery apparatus can be detected. The rotational speed, the torque and the power are alternatively or cumulatively suitable for transmitting an operating state of the drive unit to the control device.

It is also provided that the pressure sensor is arranged in the region of the outlet of the rotor-stator unit, or that the pressure sensor is arranged downstream of the outlet of the rotor-stator unit of the eccentric screw pump in a region of the delivery section of the delivery apparatus. The actual pressure is thereby always measured in a range in which said actual pressure is already influenced by the power of the drive unit.

Furthermore, it is provided that the pressure sensor is arranged in a region of the outlet of the rotor-stator unit, and that a further pressure sensor is arranged downstream of the outlet of the rotor-stator unit of the eccentric screw pump in a region of the delivery section of the delivery apparatus. By this means, firstly, correct operation can be maintained even in the event of failure of a pressure sensor and, by this means, secondly, by means of a comparison of the actual pressures measured by the pressure sensors, a conclusion can also be drawn regarding clogging or leakage of that region of the delivery section which lies between the pressure sensors.

Finally, it is provided that the delivery apparatus comprises a target-pressure setting device for manually setting a target pressure, or that the target pressure to be produced by the eccentric screw pump can be set by means of an application which can be executed on an electronic device, wherein the control device and the electronic device are connected, for data traffic, wirelessly by means of a direct connection or wirelessly via a mobile radio network. By this means, the advantages of an on-site control and a remote control are provided alternatively or cumulatively. By means of operation via the electronic device, it is easily possible for a site manager to monitor even a plurality of delivery apparatuses or to set same within a short time from a single location.

Within the context of the present invention, a target pressure should also be understood as meaning a target pressure range which extends from a pressure value lying 10% and, in particular, 5% below the target pressure to a pressure value lying 10% and, in particular, 5% above the target pressure.

BRIEF DESCRIPTION OF THE DRAWINGS

Further details of the present invention are described in the drawing with reference to schematically illustrated exemplary embodiments.

FIG. 1 here shows a partially sectioned side view of a delivery apparatus according to the present invention.

DETAILED DESCRIPTION OF THE INVENTION

A delivery apparatus 1 according to the present invention is illustrated in a partially sectioned side view in FIG. 1. For the basic operation of the delivery apparatus 1, reference is also made to the applicant's DE 20 2009 014 678 U1 already mentioned above.

The delivery apparatus 1 comprises an eccentric screw pump 2, a drive unit 3 and a control device 4. The eccentric screw pump 2 comprises a rotor-stator unit 5 with a delivery screw 5a and an outlet 6. Furthermore, the delivery apparatus 1 comprises a delivery section 7 which is connected to the outlet 6 of the rotor-stator unit 5. The delivery section 7 comprises a hose 7a and a discharging device 7b by means of which the output of liquid construction material BM can be activated and can be deactivated and preferably also can be metered.

Furthermore, the delivery apparatus 1 comprises a first pressure sensor 8 and a characteristic-variable detection device 9. The characteristic-variable detection device 9 comprises a rotational speed sensor 10 by means of a which a rotational speed of a drive 11 of the drive unit 3 of the delivery apparatus 1 can be detected. The drive 11 here is in the form of a BLDC electric motor 12, and the rotational speed sensor 10 comprises at least one HALL sensor 13 installed directly on the BLDC electric motor 12. In addition to the drive 11, the drive unit 3 also comprises a transmission 14 which is installed between the drive 11 and the eccentric screw pump 2. According to a variant embodiment which is not illustrated, it is also provided that the drive comprises an asynchronous motor with a frequency converter, or another suitable motor.

According to a variant embodiment which is not illustrated, it is also provided that the rotational speed sensor is arranged in such a manner that a rotational speed of the delivery screw of the eccentric screw pump is detected with the rotational speed sensor.

According to a variant embodiment which is not illustrated, as an alternative or in addition to the detection of a rotational speed, it is also provided that the delivery apparatus comprises, as the characteristic-variable detection device, a torque sensor by means of which a torque of the delivery screw of the eccentric screw pump or of a drive of the drive unit of the delivery apparatus can be detected.

According to a variant embodiment which is not illustrated, as an alternative or in addition to the detection of a rotational speed with a rotational speed sensor and/or to the detection of a torque with a torque sensor, it is also provided that the delivery apparatus comprises, as the characteristic-variable detection device, a power sensor by means of which a power of the delivery screw of the eccentric screw pump or a drive of the drive unit of the delivery apparatus can be detected.

In FIG. 1, in addition to a first variant embodiment, in which the delivery apparatus 1 comprises only one, namely the first, pressure sensor 8, a second to sixth variant embodiment is also shown.

In this connection, in the second variant embodiment, the delivery apparatus 1 comprises, in addition to the first pressure sensor 8, a second pressure sensor 15 which is arranged approximately in the center of the hose 7a and detects an ACTUAL pressure in the hose 7a.

In this connection, in the third variant embodiment, the delivery apparatus 1 comprises, in addition to the first pressure sensor 8, a second pressure sensor 16 which is connected to the discharge apparatus and detects the ACTUAL pressure there in a section through which the flowable construction material flows.

In this connection, in the fourth variant embodiment, the delivery apparatus 1 comprises the pressure sensor 15 as a single pressure sensor.

In this connection, in the fifth variant embodiment, the delivery apparatus 1 comprises the pressure sensor 16 as a single pressure sensor.

In this connection, in the sixth variant embodiment, the delivery apparatus 1 comprises three pressure sensors, namely the pressure sensors 8, 15 and 16.

In all of the variant embodiments, the respectively present pressure sensor or the respectively present pressure sensors is or are connected wirelessly or in a wire-bound manner to the control device 4 which comprises a PI controller 4a for controlling the drive.

The description below is relevant to all of the variant embodiments unless differing statements regarding individual variant embodiments are expressly made. The delivery apparatus 1 also comprises an operating device 17 which is connected to the control device 9. The operating device 17 comprises an emergency off button 18, a start button 19 and a stop button 20. Furthermore, the operating device 17 comprises a target-pressure setting device 21 and an operating-mode setting device 22. The target-pressure setting device 21 comprises a display 21a, a first selection button 21b and a second selection button 21c. The desired target pressure can be set by pressing the selection buttons 21b or 21c. The operating-mode setting device 22 comprises a display 22a, a first selection button 22b and a second selection button 22c. The desired operating mode can be set by pressing the selection buttons 22b or 22c. In this case, the operating modes "delivering", "filling and cleaning the eccentric screw pump" and "rearward delivering of construction material" are provided. The operating mode "delivering" is also referred to as the "working mode" or "normal mode". On the basis of the parameters set in each case, then, by pressing the start button 19, for example, delivering of the construction material BM at a target pressure default of 100 bar takes place. The delivery apparatus 1 comprises a filling container 23 via which the construction material BM is supplied to the eccentric screw pump 2. With a target pressure default of 100 bar, the delivery apparatus 1—as illustrated—is equipped with the rotor-stator unit 5 which is suitable for delivering construction material in the form of mortar or plaster. Target pressure defaults of up to 60 bar are provided for delivering mortar or plaster. If paint is intended to be delivered as the construction material, the rotor-stator unit 5 is exchanged for a rotor-stator unit, not illustrated, which is designed differently, in particular, in respect of number of windings and diameter. Target pressure defaults of up to 180 bar are then provided here.

For delivering construction material with the delivery apparatus, it is provided that—as already described above—a target pressure which the eccentric screw pump 2 pumping the flowable construction material BM is intended to achieve at its outlet 6 or at a delivery section 7 arranged downstream of the outlet 6 is preset at the target-pressure setting device 21, that a characteristic variable, namely a rotational speed of the drive 11 of the drive unit 3, is measured by means of a rotational speed sensor 10, wherein it can also be provided in addition or alternatively that a mechanical or electrical power and/or a torque and/or a current received by the drive is measured, that an actual pressure is measured by the pressure sensor 8 in a region of the outlet 6 of the rotor-stator unit 5, that a change in the actual pressure measured by the pressure sensor 8 is related to the characteristic variable "rotational speed" detected by the rotational speed sensor 10 and/or to at least one other characteristic variable in such a manner that, in the event of a rise in the actual pressure measured by the pressure sensor 8 above the preset target pressure, a reduction of the characteristic variable "rotational speed of the drive" and/or of at least one other characteristic variable is effected by the control device 4 in such a manner that the target pressure is achieved again, and that, in the event of a pressure drop in the actual pressure measured by the pressure sensor 8 below the preset target pressure, an increase of the characteristic variable "rotational speed of the drive" and/or of at least one other characteristic variable is effected by the control device 4 in such a manner that the target pressure is achieved again.

Depending on the options with which the control device 4 can act on the drive 11, it is alternatively or cumulatively also provided to act on the characteristic variable of torque of the drive and/or the characteristic variable of power of the drive, with the characteristic variables of course being related to one another.

If more than one pressure sensor, namely the pressure sensors 8 and 15 or 8 and 16 or 15 and 16, are used for monitoring the predetermined target pressure, the control device 4 for the sensors 5 and 16 takes into consideration a measured or calculated pressure drop which is determined by the distance of the sensors 15 or 16 from the outlet 6 and the properties of the hose 7a, such as, for example, diameter and elasticity.

In a variant embodiment of the delivery apparatus 1 having at least two pressure sensors, for example, 8 and 15 or 8 and 16 or 15 and 16 or 8 and 15 and 16, it is provided that a pressure difference between the actual pressure measured by the first pressure sensor and the actual pressure measured by the further pressure sensor is determined by the control device, and that an optical and/or acoustic warning signal is activated and/or the power of the drive unit is reduced and/or a drive of the drive unit of the rotor-stator unit of the eccentric screw pump is switched off if the actual pressure measured by the second pressure sensor differs considerably from the actual pressure measured by the first pressure sensor.

A rotational speed of the delivery screw 5a of the delivery apparatus 1 is at maximum 300 rpm and preferably at maximum 270 rpm at idle speed. Under load, i.e. when flowable construction material is being delivered or in what is referred to as the "normal mode", the rotational speed of the delivery screw 5a of the delivery apparatus 1 is at maximum 300 rpm and preferably at maximum 260 rpm. In the operating modes "filling and cleaning of the eccentric screw pump" and "rearward delivering of construction material", the rotational speed is limited to at maximum 100 rpm and preferably at maximum 80 rpm.

Alternatively or cumulatively to the operating device 17, it is provided that the delivery apparatus 1 comprises an electronic device 24 on which an application or App is executed by means of which the delivery apparatus 1 can be operated in a comparable manner to the operating device 17. For this purpose, the electronic device 24, which is in the form, for example, of a mobile telephone or a tablet, is connected wirelessly to the control device 4. In this case, it is alternatively or cumulatively provided that a direct wireless radio connection is established or that the electronic device 24 and the control device 4 are connected to each other via a mobile radio network. Both the electronic device 24 and the control device 4 each comprise a corresponding radio module or corresponding radio modules.

The application mentioned is in the form here of a mobile application or application solution which is provided for use on mobile telephones irrespective of the operating system. In this case, the mentioned wireless radio connection to the control device can be provided, in particular, as a WIFI radio connection or as a Bluetooth radio connection, but it may also be designed as a mobile radio connection. In the case of the latter, the control device can be equipped for this purpose with a mobile radio module. The mobile App solution is preferably also programmed in such a manner that, for monitoring and controlling the same delivery device, the App solution can be installed on a plurality of mobile telephones, wherein then preferably one of the mobile telephones is defined as a master device by means of which control commands and/or inputs of the other mobile telephones can be overridden. It is provided, in particular, that the target pressure can be set by means of the App solution installed on the mobile telephone. This can be facilitated, in particular, by the fact that the App solution is used to immediately select the associated control program and therefore also the appropriate target pressure by selecting a certain pumping unit as a result of stored data. In order to improve the control results, it is also provided that the hose unit, which is defined, in particular, by hose length and hose diameter, is also defined as a further machine parameter in addition to the determination of the pumping unit. If, because of the selected hose unit, two or more pressure sensors are then installed on the delivery device, it is provided that even a pressure drop between the sensors, the pressure drop being determined by the parameters of the hose, is calculated by the App solution or the value of the pressure drop is stored in the App solution. Furthermore, it is provided that, in order to optimize the operation of the delivery device and the eccentric screw pump thereof, characteristic variables of the construction material, such as type (for example, mortar, paint, plaster) and/or grain size are input. By this means, the control program can then be optimized by means of the App solution. Furthermore, it is provided that the users are notified by means of the App solution via the mobile telephone if the delivery device threatens to run dry. Finally, it is provided that the users can use the App solution to retrieve the number of operating hours, service intervals, malfunctions and further information for each delivery device registered with the App solution.

List Of Reference Signs:
 1 Delivery apparatus
 2 Eccentric screw pump
 3 Drive unit
 4 Control device
 4a PI controller
 5 Rotor-stator unit of 2
 5a Delivery screw of 5
 6 Outlet of 5
 7 Delivery section
 7a Hose of 7
 7b Discharge device of 7
 8 Pressure sensor
 9 Characteristic-variable detection device
 10 Rotational speed sensor
 11 Drive of 3
 12 BLDC electric motor
 13 HALL sensor as 10
 14 Transmission of 3
 15 Second pressure sensor
 16 Third pressure sensor
 17 Operating device
 18 Emergency off button
 19 Start button
 20 Stop button
 21 Target-pressure setting device
 21a Display
 21b, 21c Selection button
 22 Operating-mode setting device
 22a Display
 22b, 22c Selection button
 23 Filling container
 24 Electronic device
 BM Construction material

The invention claimed is:

1. A method for operating a delivery apparatus for delivering a flowable construction material, wherein the delivery apparatus comprises a control device, an eccentric screw pump having a rotor-stator unit with an outlet, and a drive unit, comprising the steps:
   a target pressure at the outlet of the eccentric screw pump or at a delivery section arranged downstream of the outlet is preset at a target-pressure setting device,
   a characteristic variable, including at least one of a mechanical power, electrical power, a rotational speed, a torque, and a current of the drive unit of the eccentric screw pump is measured,
   an actual pressure in a region of the outlet of the rotor-stator unit and/or in the delivery section arranged downstream of the outlet is measured by at least one pressure sensor,
   a change in the actual pressure measured by the at least one pressure sensor is related to at least one of the characteristic variables,
   wherein, in the event of a rise in the actual pressure above the target pressure, a reduction at least of one of the characteristic variables is adjusted by the control device so that the target pressure is achieved again,
   wherein, in the event of a pressure drop in the actual pressure below the target pressure, an increase at least of one of the characteristic variables is adjusted by the control device so that the target pressure is achieved again, and
   wherein, in switching positions, in which an operating-mode setting device is adjusted to "filling and cleaning the eccentric screw pump", pressure changes detected by the at least one pressure sensor are ignored by the control device and, in said switching positions of the operating-mode setting device, the drive unit is operated at a constant rotational speed or at a constant torque or at a constant power which is greater than 0% and at most 50% of a rotational speed or a torque or a power with which the drive unit is operated in a "normal mode".

2. The method according to claim 1, wherein the actual pressure is measured by at least two pressure sensors, wherein the actual pressure is measured by a first pressure sensor at the outlet, and wherein the actual pressure is measured by a second pressure sensor at the delivery section arranged downstream of the outlet, wherein the delivery section also comprises a discharging device out of which the flowable construction material is sprayed.

3. The method according to claim 1, wherein, during operation, the target pressure is achieved so that, in the control device, on the basis of a difference between the at least one measured actual pressure and the target pressure, an adapted characteristic variable value, including at least one of an adapted mechanical power value, an adapted electrical power value, an adapted rotational speed value, an adapted torque value, an adapted value of the current determined by a PI controller and a power, a rotational speed, and a torque of the drive of the eccentric screw pump is set to said value or values.

4. The method according to claim 2, wherein a pressure difference between the actual pressure measured by the first pressure sensor at the outlet and the actual pressure measured by the second pressure sensor at the delivery section is determined by the control device, and wherein an optical and/or acoustic warning signal is activated and/or the power of the drive unit is reduced and/or a drive of the drive unit of the rotor-stator unit of the eccentric screw pump is switched off if the actual pressure measured by the second pressure sensor differs considerably from the actual pressure measured by the first pressure sensor.

5. The method according to claim 1, wherein the eccentric screw pump is operated either with a first rotor-stator unit for delivering paint, or wherein the eccentric screw pump is operated with a second rotor-stator unit for delivering mortar or plaster, and in that the control device, depending on the first or second rotor-stator unit being in operation, is operated either by a first control program which is adapted to the first rotor-stator unit and to target pressures of from greater than 0 bar up to 180 bar, or is operated by a second control program which is adapted to the second rotor-stator unit and to target pressures of from greater than 0 bar up to 60 bar.

6. The method according to claim 1, wherein, in switching positions, in which an operating-mode setting device is on "filling and cleaning the eccentric screw pump", pressure changes detected by the at least one pressure sensor up to a limit value are ignored by the control device and, in said switching positions of the operating-mode setting device, the drive unit is operated at a constant rotational speed or a constant power which is greater than 0% and at most 50% of a rotational speed or power with which the drive unit operates in a normal mode and, in said switching positions of the operating-mode setting device, the drive unit is switched off if the limit value is measured at the pressure sensor or at one of the pressure sensors.

7. The method according to claim 1, wherein, in a switching position, in which an operating-mode setting device is on "rearward delivering of construction material", pressure changes detected by the at least one pressure sensor are ignored by the control device, and in that, in said switching position of the operating mode setting device, the drive unit is operated in a reverse direction of rotation at a constant rotational speed or a constant torque which, in comparison to a normal mode, is greater than 0% and at most 50% of a rotational speed or a torque with which the drive operates in a normal mode.

8. The method according to claim 1, wherein, in a switching position, in which an operating-mode setting device is on "rearward delivering of construction material", pressure changes detected by the at least one pressure sensor up to a limit value are ignored by the control device, and in that, in said switching position of the operating-mode setting device, the drive unit, with an actual pressure lying below the limit value, is operated in a reverse direction of rotation at a constant rotational speed or a constant torque which is greater than 0% and at most 50% of a rotational speed with which the drive unit operates in a normal mode, and, in said switching position of the operating-mode setting device, the drive is switched off when an actual pressure reaches the limit value.

9. The method according to claim 1, wherein the target pressure to be produced by the eccentric screw pump is set by means of a manually actuable target-pressure setting device arranged on the delivery apparatus or in that the target pressure to be produced by the eccentric screw pump is set by means of an application which is executed on an electronic device, wherein data traffic between the control device and the electronic device is carried out wirelessly by means of a direct connection or wirelessly via a mobile radio network.

10. The method according to claim 1, wherein the delivery apparatus is operated in a normal mode in such a manner that, in the event of a sudden drop in the actual pressure, the sudden drop being determined by the first pressure sensors, the drive unit is switched off and/or an acoustic or optical interfering signal is activated by the control device and/or an interfering signal is transmitted by the control device to an electronic device if the drop in the actual pressure is established without a power drop of the drive unit being established.

11. The delivery apparatus for carrying out a method according to claim 1, comprising an eccentric screw pump having a rotor-stator unit with an outlet, a drive unit, a control device and a delivery section, wherein the delivery apparatus comprises at least one pressure sensor and a characteristic-variable detection device.

12. The delivery apparatus according to claim 11, wherein the characteristic-variable detection device comprises a rotational speed sensor by means of which a rotational speed of the delivery screw of the eccentric screw pump or of a drive of the drive unit of the delivery apparatus is detected, and/or wherein the characteristic-variable detection device comprises a torque sensor by means of which a torque of the delivery screw of the eccentric screw pump or of a drive of the drive unit of the delivery apparatus can be detected, and/or wherein the characteristic-variable detection device comprises a power sensor by means of which a power of the delivery screw of the eccentric screw pump or of a drive of the drive unit of the delivery apparatus is detected.

13. The eccentric screw pump according to claim 11, wherein the pressure sensor is arranged in the region of the outlet of the rotor-stator unit, or wherein the pressure sensor is arranged downstream of the outlet of the rotor-stator unit of the eccentric screw pump in a region of the delivery section of the delivery apparatus.

14. The delivery apparatus according to claim 11, wherein the pressure sensor is arranged in a region of the outlet of the rotor-stator unit, and wherein a further pressure sensor is arranged downstream of the outlet of the rotor-stator unit of the eccentric screw pump in a region of the delivery section of the delivery apparatus.

15. The delivery apparatus according to claim 11, wherein the delivery apparatus comprises a target-pressure setting device for manually setting the target pressure, or wherein the target pressure to be produced by the eccentric screw pump is set by means of an application which is executed on an electronic device, wherein the control device and the electronic device are connected, for data traffic, wirelessly by means of a direct connection or wirelessly via a mobile radio network.

* * * * *